INVENTOR.
FRED C. STEVENS
BY
ATTORNEY

Sept. 1, 1970     F. C. STEVENS     3,526,439
NON-SKID BRAKING SYSTEM
Filed Nov. 29, 1968     2 Sheets-Sheet 2

INVENTOR.
FRED C. STEVENS
BY
ATTORNEY

United States Patent Office 3,526,439
Patented Sept. 1, 1970

3,526,439
NON-SKID BRAKING SYSTEM
Fred C. Stevens, 1 Garrett Place,
Bronxville, N.Y. 10708
Filed Nov. 29, 1968, Ser. No. 779,723
Int. Cl. B60t 8/16, 8/08
U.S. Cl. 303—21                                    8 Claims

ABSTRACT OF THE DISCLOSURE

A non-skid braking system for vehicles including an inertia wheel adapted to measure wheel slippage, valve means actuated when incipient slippage occurs to cut off brake fluid pressure to the brake cylinder and to remove a portion of the fluid from such cylinder and a pump cylinder adapted to return such fluid to the system after each such actuation.

---

This invention relates to braking systems for vehicles and more particularly to a non-skid braking system.

An object is to provide a system of the above type in which the vehicle wheels are prevented from slipping on the pavement to an extent which could produce skid conditions regardless of the braking pressure which may be applied by the driver.

Another object is to provide such a system wherein the brake fluid pressure is automatically cut off from the wheel brake cylinder and the fluid pressure in the brake cylinder is relieved when incipient skid conditions arise.

A further object is to provide such a system in which the portion of the brake fluid which is removed from the wheel brake cylinder is returned to the system after each operation of the device.

Various other objects and advantages will be apparent as the nature of the invention is more fully disclosed.

In accordance with the present invention a speed sensing wheel is connected to be driven at a speed proportional to the speed of a vehicle wheel and an inertia wheel is connected to be driven thereby but is free to override the sensing wheel when the latter decelerates. A brake actuated in response to the pressure of the brake fluid exerts a drag on the inertia wheel suited to cause the inertia wheel to decelerate at a rate corresponding to the maximum permissible rate of the vehicle wheel under the brake pressure being applied.

A valve mechanism is actuated in response to a predetermined difference in rates of the sensing wheel and the inertia wheel to cut off the supply of brake fluid to the wheel brake cylinder and to remove a portion of the fluid from such cylinder so as to relieve the brake pressure. The portion of the fluid so removed is returned to the system by a pump cylinder which is actuated in response to the pressure of such fluid.

The nature of the invention will be better understood from the following description, taken in connection with the accompanying drawings in which a specific embodiment has been set forth for purposes of illustration.

Figure 1:
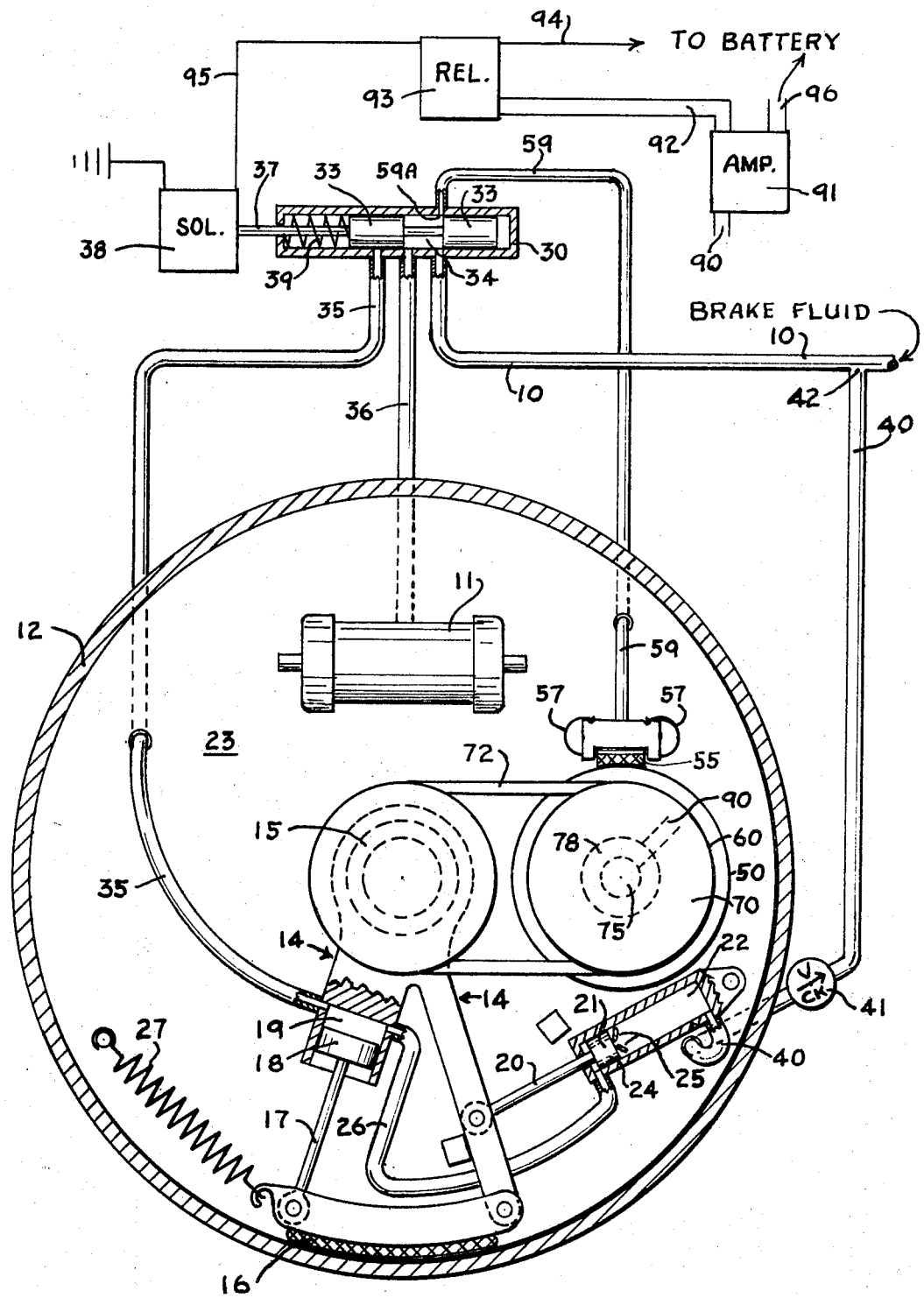
FIG. 1 is a diagrammatic view of a braking system embodying the present invention.
Figure 2:
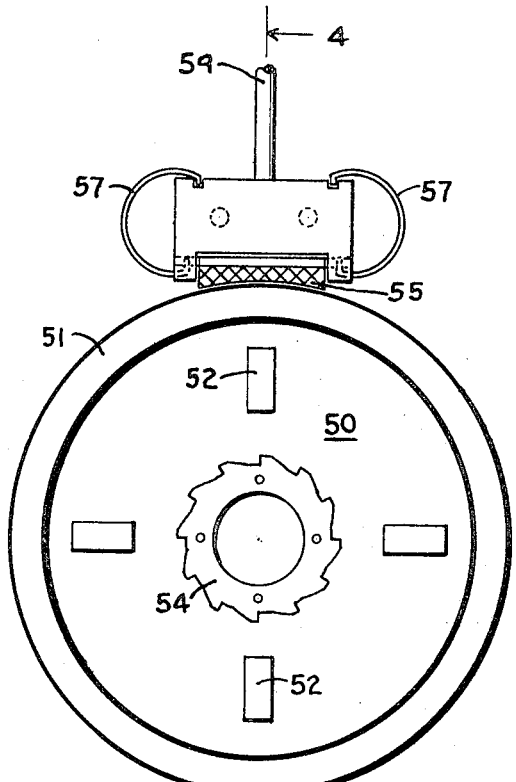
FIG. 2 is an elevation of the inertia wheel.
Figure 4:
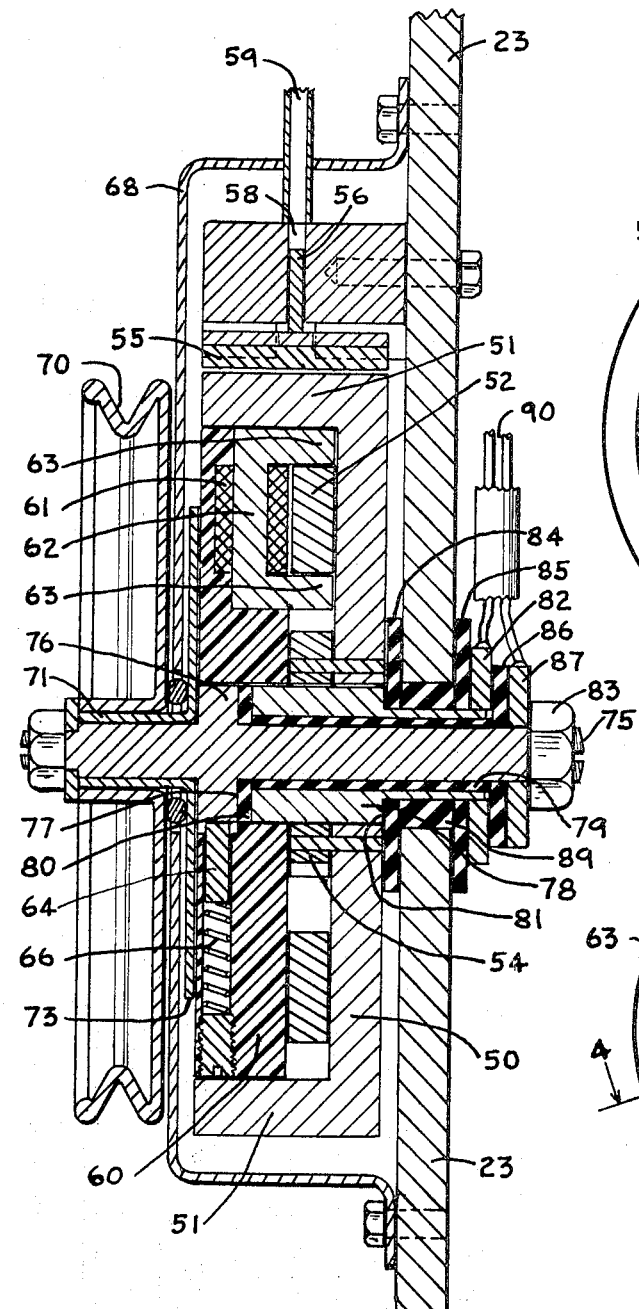
FIG. 4 is a longitudinal section through the sensing unit on an enlarged scale.
Figure 3:
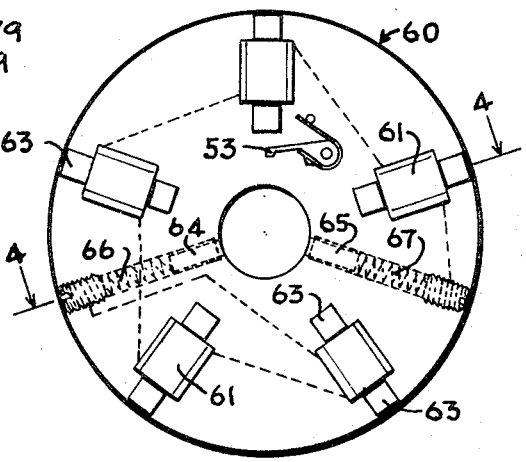
FIG. 3 is an elevation of the speed sensing wheel.

Referring to the drawings more in detail the invention is shown as embodied in a braking system for a motor vehicle having hydraulically operated brakes including a master cylinder actuated by a brake pedal to supply hydraulic fluid under pressure to a main brake fluid line 10 leading to the brake cylinder 11 which is connected to actuate the brake shoes of a brake drum 12 of a wheel of the vehicle, only one of which is shown.

The present invention provides a swinging bracket 14 having one end journalled around the axle housing 15 in which the wheel axle is carried and having a relatively small brake shoe 16 pivoted at its other end in a position to be brought into contact with the inner surface of the brake drum 12. The leading end of the brake shoe 16 is attached to a rod 17 of a piston 18 sliding in a hydraulic control cylinder 19 which is a part of the bracket 14 and is so arranged that the brake shoe 16 is brought into frictional engagement with the brake drum 12 in response to hydraulic pressure introduced into the cylinder 19.

To the bracket 14 is attached a rod 20 of a piston 21 sliding in a hydraulic pump cylinder 22 which is pivotally attached to the brake backing plate 23. The cylinder 22 is closed at both ends and piston 21 has a plurality of openings 24 closed by check valve flaps 25 so that when the piston is advanced by swinging movement of the bracket 14 it exerts pressure to pump hydraulic fluid out of the forward end of the cylinder and when retracted the check valves 25 open to permit the fluid to pass from the rearward end of the cylinder to the forward end thereof. The control cylinder 19 is connected by a line 26 to the rearward end of the pump cylinder 22. The forward end of the pump cylinder 22 is connected by a line 40 through a check valve 41 to the main brake line 10 at a point 42. A tension spring 27 engages the leading end of the brake shoe 16 and extends in a direction to retract the piston 18 and the brake shoe 16 from the brake drum 12 and to retract the bracket 14 and the piston 21 when hydraulic pressure is reduced in cylinder 19.

The main brake fluid line 10 is connected beyond the point 42 to one port in the housing 30 of a spool valve having a sliding valve element including a pair of pistons 33 spaced to form a chamber 34 therebetween. A second port of the housing 30 is connected by line 36 to the wheel brake cylinder 11 and a third port is connected by a line 35 to the control cylinder 19.

The valve pistons 33 are connected to be retracted by the core 37 of a solenoid 38 and are advanced by a compression spring 39 when solenoid 38 is deenergized. When the spool pistons 33 are in advanced position with the solenoid 38 deenergized the main brake line 10 is connected through the chamber 34 to the line 36 leading to the wheel brake cylinder 11. When the solenoid 38 is energized the spaced pistons are retracted to block the port to main brake line 10 and to connect the line 36 through chamber 34 to the line 35 so that the wheel brake cylinder 11 is connected to the control cylinder 19.

The sensing unit comprises an inertia wheel 50, a speed sensing wheel 60 and a belt pulley 70 carried by a fixed shaft 75.

The shaft 75 is formed at its free end with a boss 76 forming a shoulder 77. A sleeve 78 having an outer diameter corresponding to that of the boss 76 is disposed over the shaft 75 with an insulating sleeve 79 disposed therebetween and an insulating washer 80 between the end of the sleeve 78 and the shoulder 77. The sleeve 78 has a shoulder 81 bearing against the brake backing plate 23 through an intervening insulating washer 84 and extends with an insulating sleeve 89 through the plate 23. A terminal metal washer 82 is carried at the outer end of the sleeve 78 and is insulated from the plate 23 by a washer 85. Terminal washer 87 and insulating washer 86 are carried on the outer end of shaft 75. A nut 83 is threaded onto the outer end of the shaft 75 to clamp the assembly to the brake backing plate. By this construction both the shaft 75 and the sleeve 78 are insulated from the brake backing plate and from each other.

The drive pulley 70 is fixed to a sleeve 71 which is journalled on the shaft 75 and is driven by a belt 72 from the wheel axle or from other means rotating with the wheel of the vehicle.

The speed sensing wheel 60 is journalled on the boss 76 and over the end portion of the sleeve 78 and is connected to a disc 73 attached to the sleeve 71 to be driven by the belt pulley 70. This wheel 60 may be made of plastic and carries a plurality of coils 61 which are peripherally spaced therearound. Each coil 61 is wound on a radially extending cross leg 62 of a U shaped core having parallel projecting poles 63 extending axially beyond the surface of the wheel 60 on the side toward the inertia wheel 50. These coils 61 are connected in series and terminate in a pair of brushes 64 and 65 disposed in suitable holes in the wheel 60 and held by springs 66 and 67 against the boss 76 and the sleeve 78, respectively.

The inertia wheel 50 is journalled on the sleeve 78 and is formed with a rim 51 to provide the desired weight for inertial purposes. This wheel is preferably made of brass or other non-magnetic material and carries a series of peripherally spaced permanent magnets 52 all polarized in the same radial direction and positioned to pass between the poles 63 of the cores 62 when the inertia wheel 50 rotates with respect to the speed sensing wheel 60.

A pawl 53 on the speed sensing wheel 60 engages a ratchet 54 carried by the inertia wheel 50 to drive the inertia wheel in one direction but to allow free rotation of the inertia wheel 50 when it overrides the sensing wheel 60.

A brake 55 carried by the piston rod 56 sliding in a cylinder 58 engages the rim 51 to apply a drag to the inertia wheel in response to the application of fluid pressure to the cylinder 58. A line 59 connects the cylinder 58 to a port 59A in the valve housing 30 so that the braking pressure is applied to the cylinder 58 when pistons 33 are advanced and fluid pressure is maintained in cylinder 58 when the pistons 33 are retracted to block the port 59A. Brake 55 is advanced by fluid pressure in cylinder 58 and is retracted by springs 57.

A cover 68 may be provided to enclose the unit.

The terminal washers 82 and 87 are connected by leads 90 to an amplifier 91 the output of which is connected by leads 92 to a relay 93. The relay 93 has a lead 94 connected to the vehicle battery, (not shown), and a lead 95 connected to operate the solenoid 38. The amplifier is connected to the battery by leads 96. A pressure switch, (not shown), similar to a stop light switch may be connected in the battery circuit to prevent the flow of current to the amplifier 91 except when the vehicle brakes are applied.

In operation the device is intended to reduce the fluid pressure in the wheel brake cylinders when the vehicle brakes are applied to such an extent that the wheels decelerate at a faster rate than the maximum rate which would be normally obtained without wheel slippage in response to the fluid pressure which is being applied. Under normal driving conditions the main brake fluid line 10 is connected through chamber 34 and line 36 to the brake cylinder 11 and through port 59A and line 59 to the inertia wheel brake cylinder 58 so that the main brake fluid pressure is applied also to cylinder 58. Hence the drag on the inertial wheel 50 due to the pressure of brake 55 is proportional to the applied braking pressure. The speed sensing wheel 60 is driven by the belt 72 at a speed proportional to the vehicle speed, and the inertia wheel 50 is driven by the wheel 60 at the same speed by the pawl 53 and ratchet 54. Hence there is no relative movement between the wheels 50 and 60 and no voltage is generated in the coils 61.

If the brakes are applied under normal conditions to stop the vehicle without wheel slippage the sensing wheel 60 decelerates with the vehicle wheel. The inertia wheel however, would be free to override the sensing wheel and would do so except for the application of the brake 55 in response to the pressure of the braking fluid in the cylinder 58. This brake should be so adjusted that the inertia wheel 50 decelerates with the sensing wheel 60 under conditions which do not produce undesired slippage of the vehicle wheel.

If, however, the vehicle wheel should tend to slip on the pavement its rate of deceleration would become greater and the deceleration of the sensing wheel would also become greater. The inertia wheel 50 would then override the sensing wheel 60 and the magnets 52 would pass between the poles 63 of the coils 61. A voltage would be developed in the coils having a value which is a function of the relative rates of rotation of the inertia wheel and of the sensing wheel. The voltage is thus a function of the amount of slippage of the vehicle wheel.

In practice a certain limited amount of slippage is desirable for maximum braking and the amplifier 91 and relay 93 are so adjusted that when the voltage exceeds a value corresponding to the desired slippage the relay 93 is actuated to supply battery voltage to the solenoid 38 and retract the spool valve pistons 33.

When the spool valve is retracted the main brake fluid line 10 is blocked and no more fluid pressure can be applied to the brake cylinder 11. The port 59A is also blocked to hold the then obtaining fluid pressure in cylinder 58. Also the brake cylinder 11 is connected through chamber 34 to the control cylinder 19 and brake fluid flows from the wheel cylinder 11. This relieves the brake pressure on the drum 12 allowing the brake to release to the point such that the desirable limited amount of vehicle wheel slippage is not surpassed, thus preventing an incipient skid from being initiated.

The fluid pressure thus applied to the cylinder 19 advances the brake 16 into contact with the drum 12 so as to exert a drag sufficient to swing the bracket 14 in the direction of rotation of the vehicle wheel. The bracket 14 thus advances the piston 21 which draws fluid from cylinder 19 through line 26 and exerts pressure on the fluid in the forward end of the cylinder 22 to force the same through line 40 and check valve 41 into the main brake fluid line 10, thereby replenishing the fluid in the line 10 and preventing the master cylinder from being gradually drained by repeated operation of the system while the brake pedal is being held down.

As soon as the vehicle wheel resumes normal rotation the sensing wheel 60 again picks up the inertia wheel 50 thereby reducing the generated voltage in the coils to zero. The relay 93 then releases, the solenoid 38 is deenergized and the spool valve pistons 33 are advanced and the braking system is restored to normal operation.

The above described cycle will be repeated, however, as long as the brake fluid pressure is maintained at a value to produce undesired slippage of the vehicle wheel.

The above system makes it possible to apply the maximum braking effort which the vehicle wheels can absorb without excessive slippage. At the same time it provents slippage conditions from being maintained regardless of the applied brake pressure.

The system may be applied to the four wheels of the vehicle or to the two rear wheels only as desired. Each wheel so controlled is prevented from slipping and initiating skid conditions.

If the number of magnets is even and the number of coils is uneven or vice versa, the number of voltage pulses produced at each revolution of the inertia wheel becomes the product of the two numbers, thus producing a relatively high pulse rate. On the other hand, if the magnets and coils are so arranged that two or more of the coils are pulsed simultaneously the pulse rate would be decreased and the pulse amplitude would be correspondingly increased. While the coils have been shown as connected in series it is obvious that they may be connected in parallel if desired. In any event, the elements are so designed that the solenoid does not release between pulses.

What is claimed is:

1. A hydraulic vehicle braking system comprising a speed sensing wheel, means driving said wheel at a rate proportional to the rate of rotation of a vehicle wheel, an inertia wheel, a one way drive means connected to drive said inertia wheel with said sensing wheel but to permit said inertia wheel to override said sensing wheel when the latter decelerates, means associated with said wheels to derive a voltage proportional to the difference in rates of said wheels, a vehicle wheel brake cylinder, means supplying hydraulic brake fluid to said cylinder under braking pressure, and means responsive to a predetermined voltage derived from said sensing wheel to interrupt the supply of said fluid to said cylinder and to remove a portion of said fluid from said cylinder adapted to relieve the brake pressure on the vehicle wheel.

2. A system as set forth in claim 1 in which said voltage generating means comprises a series of coils carried by one of said wheels and permanent magnet means carried by the other of said wheels in a position to induce a voltage in said coils in response to relative rotation of said wheels.

3. A system as set forth in claim 2 in which the magnets and the coils have different angular spacings whereby the number of pulses produced at each rotation corresponds to the product of the number of coils and the number of magnets.

4. A system as set forth in claim 1 in which the brake fluid pressure is supplied to the brake cylinder through a brake pressure line, a control valve is inserted in said line, and means responsive to the sensing unit is connected to actuate said valve.

5. A system as set forth in claim 4 in which said valve is operated by a solenoid in response to a predetermine voltage derived from said sensing unit.

6. A system as set forth in claim 4 in which a swinging bracket is journalled to swing with the brake drum, a brake shoe is carried by said bracket, a control cylinder is connected to apply said brake shoe to said brake drum for causing said bracket to swing through a limited arc as the brake drum rotates, said control valve is connected to disconnect said line from said brake cylinder and to connect said brake cylinder to said control cylinder, and pump means is actuated by said bracket to return brake fluid from said control cylinder into said line.

7. A system as set forth in claim 6 in which said pump means comprises a cylinder and piston actuated by movement of said bracket, said pump cylinder is connected to receive fluid from said control cylinder, and is connected to discharge said fluid into said line.

8. A system as set forth in claim 7 in which said last cylinder includes input and output chambers on opposite sides of said piston and connected respectively to said control cylinder and to said line, passage means associated with said piston for the passage of fluid from said input chamber to said output chamber during the retraction of said piston and check valve means to prevent passage of such fluid during the advance stroke of said piston.

References Cited
UNITED STATES PATENTS 3,233,946   2/1966   Lockhart _____ 303—21

MILTON BUCHLER, Primary Examiner

J. J. McLAUGHLIN, Jr., Assistant Examiner

U.S. Cl. X.R.

188—181; 303—6; 336—110, 135